C. FOGELBERG.
Bag or Box Fastening.
No. 159,311.  Patented Feb. 2, 1875.
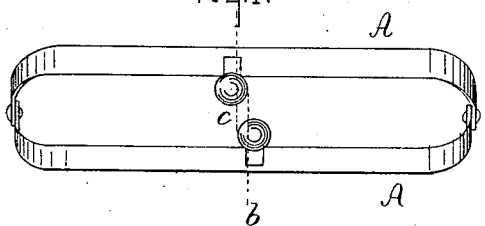
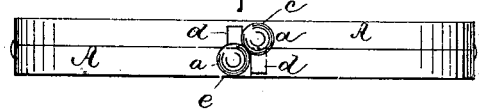
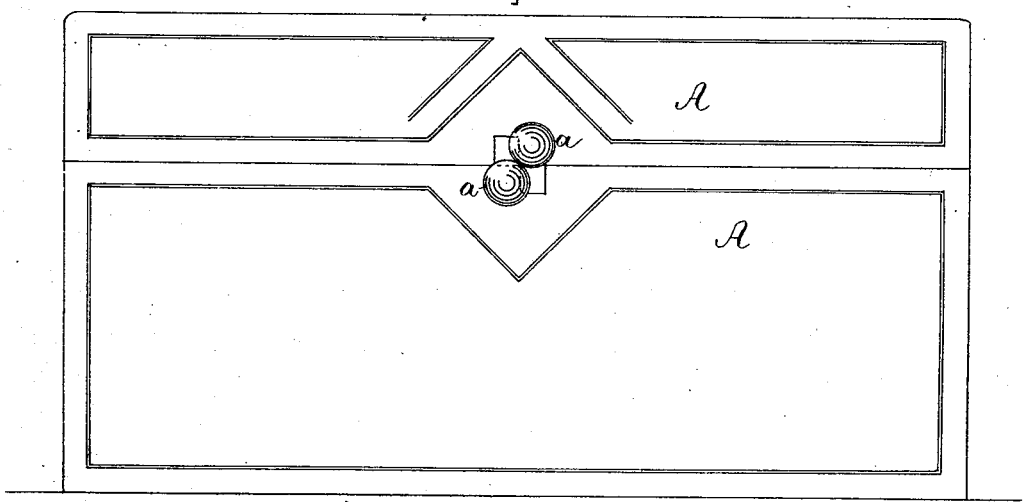
Witnesses.
L. H. Latimer.
Wm Pratt
Inventor.
Carl Fogelberg
per Crosby & Gregory
Attys.

UNITED STATES PATENT OFFICE.

CARL FOGELBERG, OF CAMBRIDGEPORT, MASSACHUSETTS.

IMPROVEMENT IN BAG OR BOX FASTENINGS.

Specification forming part of Letters Patent No. 159,311, dated February 2, 1875; application filed November 21, 1874.

*To all whom it may concern:*

Be it known that I, CARL FOGELBERG, of Cambridgeport, in the county of Middlesex and State of Massachusetts, have invented an Improvement in Bag or Box Fastening, of which the following is a specification:

My invention relates to fastenings for bags, reticules, and boxes, or other similar articles; and consists in the combination, with the frame of the bag or other article, of knobs or projections arranged so as to strike, but yield and pass each other, when they again spring into their normal position, one behind the other, and lock the two parts of the frame of the bag or box together.

Figure 1 is a top view of a bag, purse, or reticule frame opened. Fig. 2 shows the same closed, and Fig. 3 shows a box provided with my fastenings.

Springs and locks are commonly used for confining bag-frames together, and I propose to do away with such fastenings, using, instead, the very cheap and simple fastening herein described.

A are the two parts of a bag, purse, or box, adapted to turn or hinge, one on the other, by means of pivots or hinges. $d\,d$ are short spring-arms, slightly elevated from the faces of the frames A, and each provided with a knob, $a$. The adjacent faces of these knobs lie, the one in line $b$ and the other in line $c$, Fig. 1, and when the bag is closed these springs yield, allowing the knobs to pass; and when they pass each other they lock, as shown in Figs. 2 and 3, holding the parts of the bag or box firmly together.

When closed, by pressing on the outer sides, $e\,e$, of the knobs by the thumb and finger, the parts may be opened.

These knobs, instead of being round, might be of any other shape capable of moving past and locking each behind the other. One knob might be stationary, and the other mounted on an arm, so as to yield and pass around and behind the stationary one.

I claim—

In combination with the jaws, and with the knobs, the springs $d\,d$, on which the knobs are respectively mounted, as and for the purpose described.

In testimony whereof I have signed my name to this specification in the presence of two subscribing witnesses.

CARL FOGELBERG.

Witnesses:
 G. W. GREGORY,
 WM. PRATT.